No. 93,594.                      PATENTED AUG. 10, 1869.

O. B. BROWN.
OPTICAL INSTRUMENT.

Witnesses:
W. F. Huver
F. Henry Chadwick

Inventor
O. B. Brown

No. 93,594.
O. B. BROWN.
OPTICAL INSTRUMENT.
PATENTED AUG. 10, 1869.
3 SHEETS—SHEET 2.
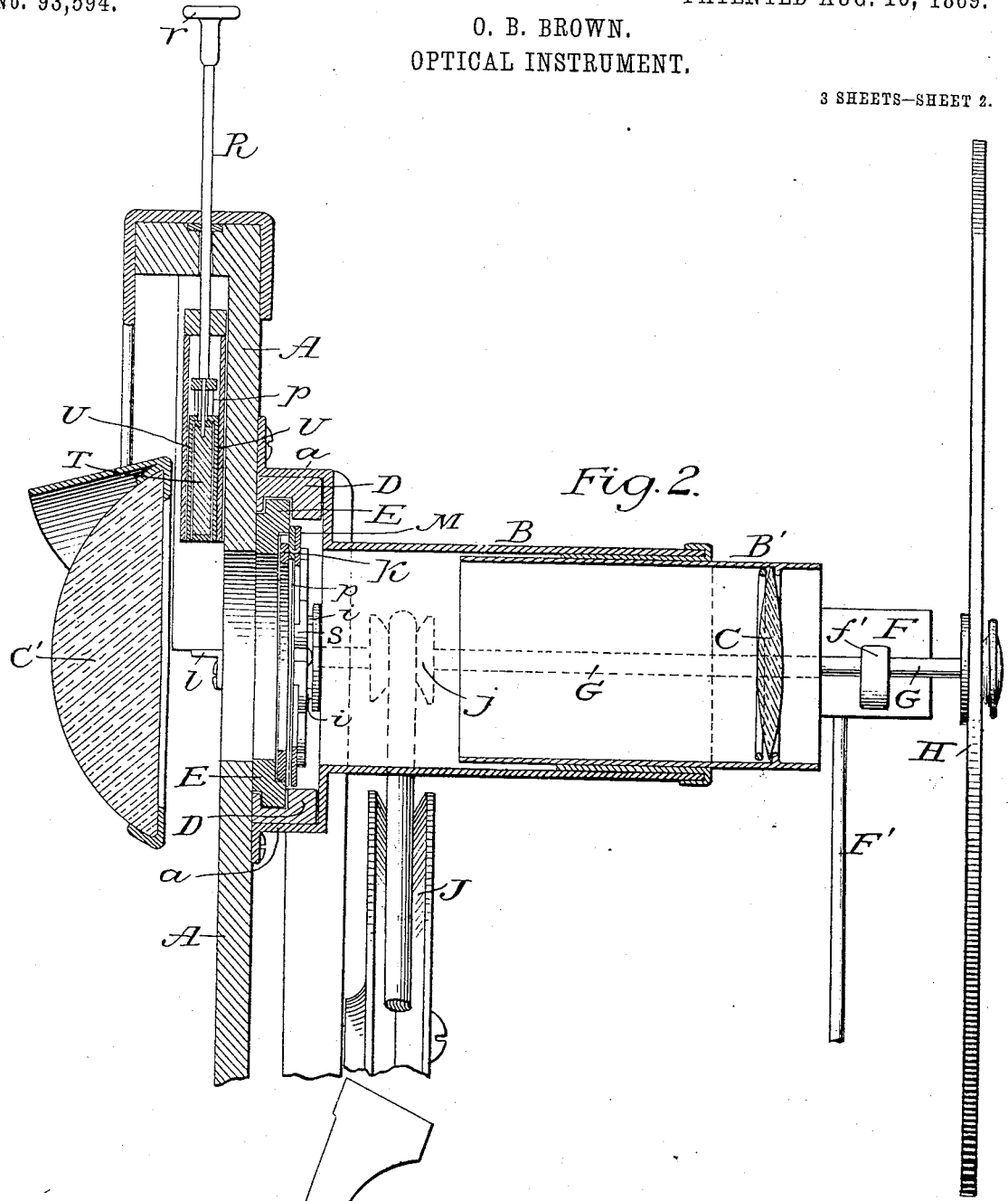
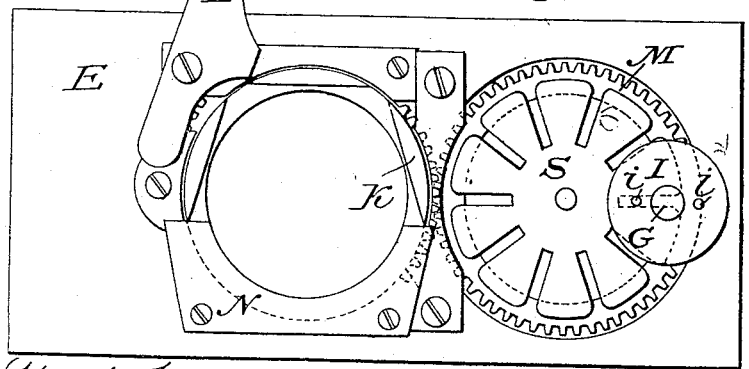
Witnesses: W. F. Haven, F. Henry Chadwick
Inventor: O. B. Brown No. 93,594.    PATENTED AUG. 10, 1869.
O. B. BROWN.
OPTICAL INSTRUMENT.

Witnesses:
W. F. Haren
F. Henry Chadwick

Inventor:
O. B. Brown.

United States Patent Office.

O. B. BROWN, OF MALDEN, MASSACHUSETTS.

Letters Patent No. 93,594, dated August 10, 1869.

OPTICAL INSTRUMENT.

The Schedule referred to in these Letters Patent and making part of the same.

*To all whom it may concern:*

Be it known that I, O. B. BROWN, of Malden, in the county of Middlesex, and State of Massachusetts, have invented a new and improved Optical Instrument; and I do hereby declare that the following is a full, clear, and exact description thereof, reference being had to the accompanying drawings, making part of this specification, and to the letters of reference marked thereon.

My invention relates to that class of optical instruments in which is included the instrument known as the phantasmascope, or phenakistoscope, by means of which, figures represented in different relative attitudes are seen successively, so as to produce the appearance of objects in motion, in consequence of the persistence of the successive visual impressions upon the retina; and also to that class of instruments in which is included the magic lantern, or phantasmagoria, by which figures are represented upon a wall or screen by means of lenses, lamps, reflecting-mirrors, and transparent plates, technically called "sliders."

The object of my invention is to combine the principle of the phantasmascope, or phenakistoscope with that of the phantasmagoria, or magic-lantern, in an instrument which may be used as an attachment to the ordinary magic-lantern and similar devices, or as a separate and independent instrument, and by means of which figures may be represented upon a wall or screen so as to produce the appearance of objects in motion.

I am aware that a Frenchman named Du Boscq has combined the phenakistoscope with the magic-lantern in such a manner as to represent upon a wall or screen one figure or group of figures at a time, by arranging in a circle upon a revolving disk transparent figures represented in different relative attitudes, and rotating said disk so as to bring said figures successively within the conjugate focus of the lens. I am likewise aware that Benjamin Pike has provided a means for representing moving figures upon a wall or screen by pivoting a circular transparent plate to the slider of a magic-lantern, and rotating said pivoted transparent plate by means of bevel gearing; also by pivoting to the slider two transparent plates and rotating them in opposite directions.

The nature of my invention consists in—

First. Transparent plates, capable of being readily attached to and detached from, and rotated in, a slider.

Second. A slider for a magic-lantern or similar instrument, so constructed that transparent plates may be readily attached thereto and removed therefrom, and provided with mechanism for imparting an intermittent rotary motion to said plates when so attached.

Third. A device by means of which the figures represented on the plates may be shown upon the wall or screen as arranged in a semicircle or less, or apparently reduced to a single figure.

Fourth. The combination of a revolving perforated disk for intermittently sutting off the light from the figures, with the mechanism for imparting an intermittent rotary motion to the plates, in such a manner that the movement of the figures shall take place during their obscuration.

To enable those skilled in the art to which my invention appertains to make and use the same, I will proceed to describe its construction and operation.

In the drawings—

Figure 2 is a longitudinal vertical section, representing my invention in a form in which it may be used either as an attachment to an ordinary magic-lantern or as a separate and independent instrument.

Figure 4 is a front view of the slider, showing the manner in which the plates are attached and the means by which they are caused to revolve.

Figure 5:
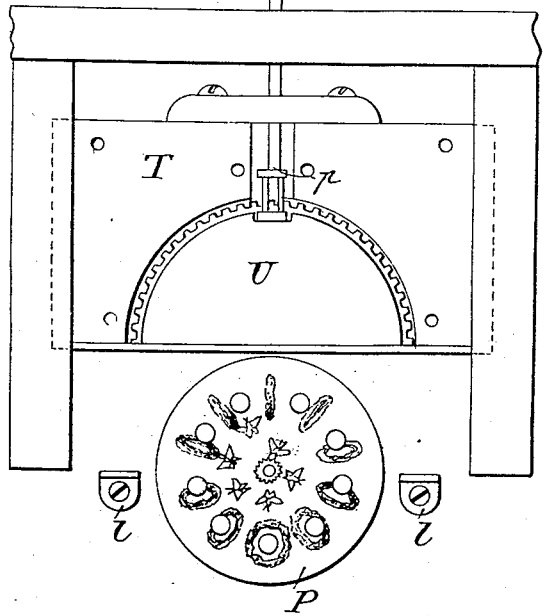
Figure 6:
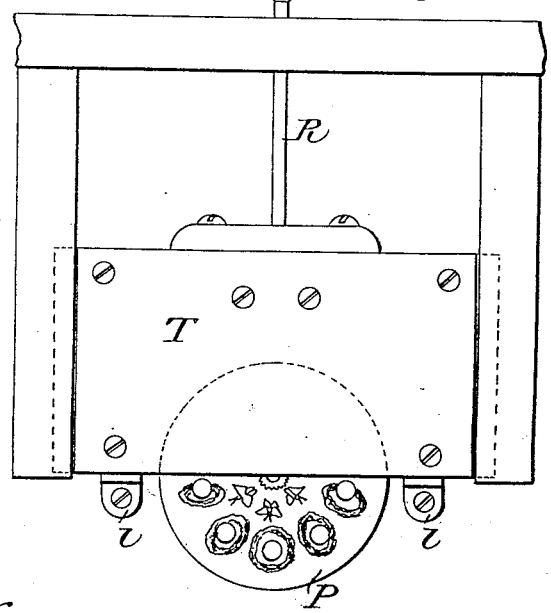
Figure 7:
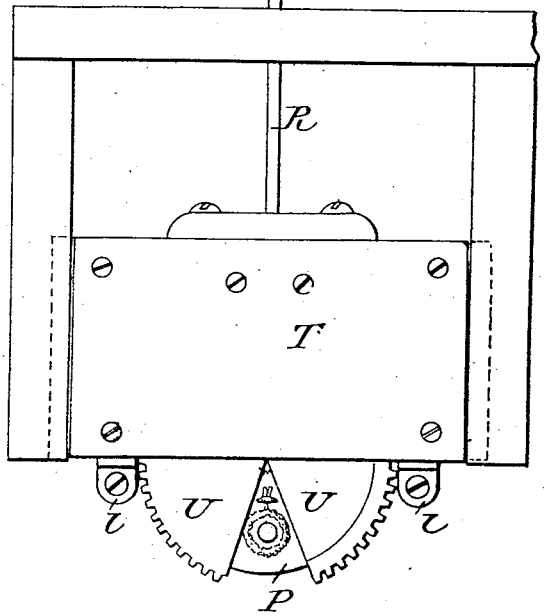

Figures 5, 6, and 7, are side views, showing the means by which the figures represented on the transparent plates are shown upon the wall or screen as arranged in a semicircle or apparently reduced to a single figure.

Figure 1:
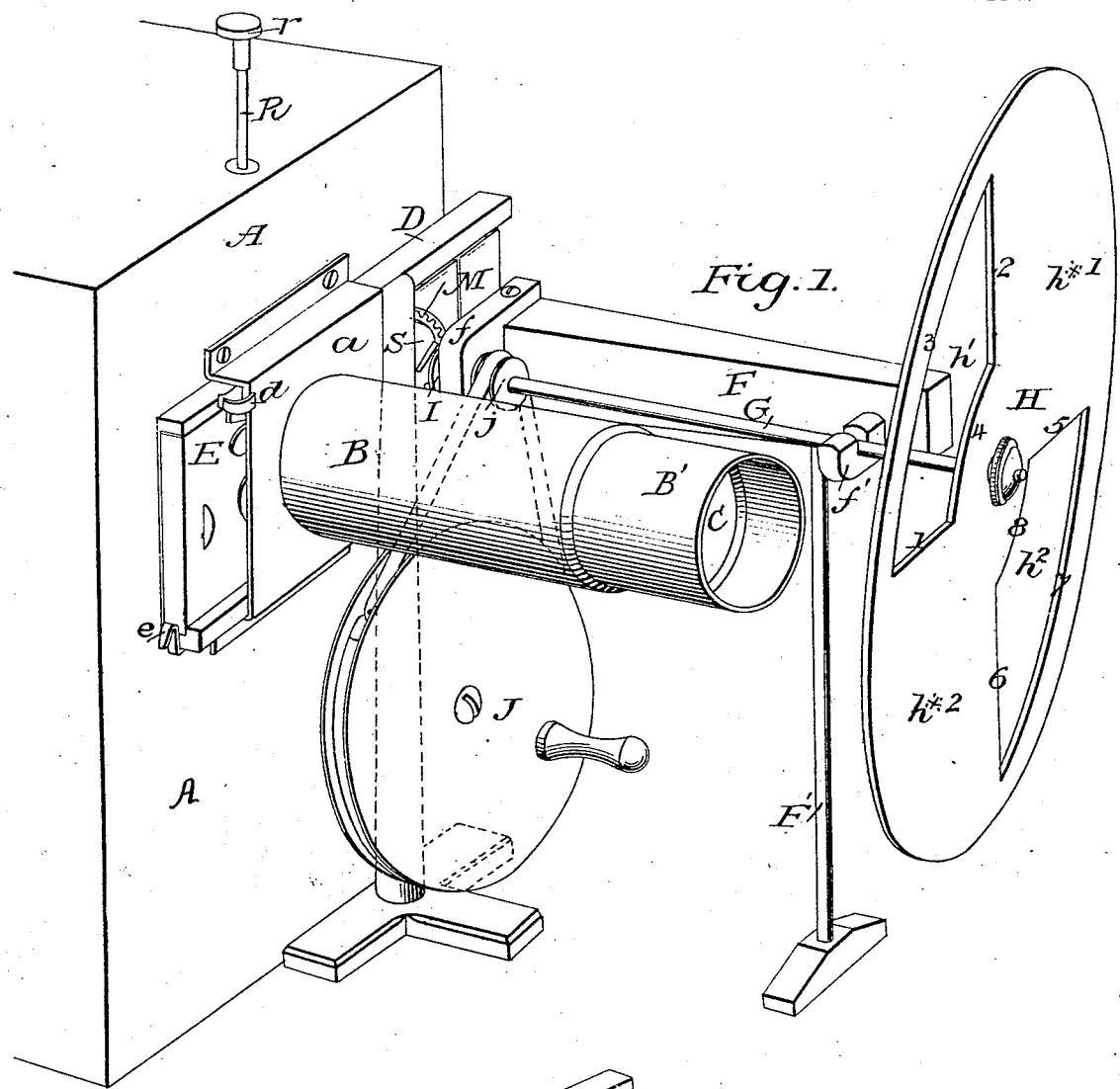
Figure 1 is a perspective view of my invention as applied to an ordinary magic-lantern or similar instrument.
Figure 3:
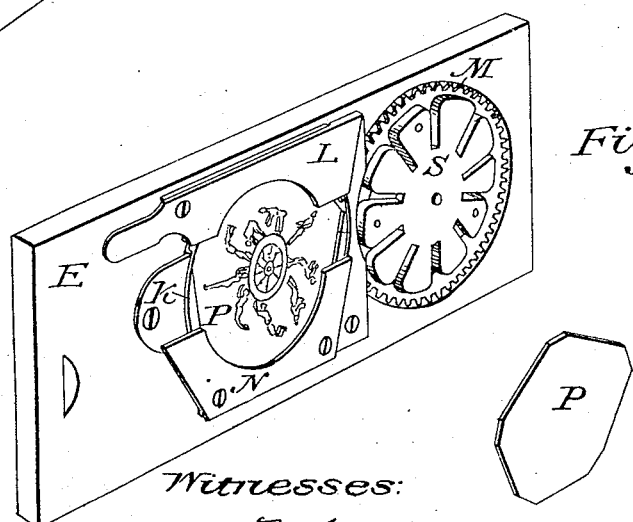
Figure 3 is a perspective view of the slider with one of the transparent plates attached thereto.

A represents the front end of a magic-lantern, to which is attached the tube B, within which slides the smaller tube B' carrying the object-lens C. A concentrating-lens is arranged between the lens C and the lamp, as shown at C' in fig. 2, and between the two lenses provision is made for the sliders. In the form shown in the drawings the metallic plate $a$ which secures the tube B to the lantern is bent so as to form a groove between the lantern and the inner end of the lens-tube, for the reception of the slider. D is a frame which fits in the groove formed by the plate $a$, and is held in place by a spring-catch $d$. The frame D receives the slider E, in which is a circular opening corresponding in size with the tube B and the opening in the front end of the lantern, and is furnished with a spring-catch $e$ which engages with the outer end of the slider and prevents it from slipping out of the frame. F is a bar attached to the frame E and supported by a standard F'. It is provided at either end with bearings $f\ f$ in which is journalled a shaft G. On the outer end of the shaft G is a disk H, which may be made of any suitable opaque material. Two curved-slots $h^1\ h^2$ are made in the disk H diametrically opposite to each other by cutting out the portions included between the radii 1 2 and arcs 3 4 and the radii 5 6 and arcs 7 8. The width of said slots $h^1$ $h^2$ is greater than the diameter of the tube B'; and their extreme length is equal to one-fourth of a circle of which the line 3 and the line 7 form arcs. The opaque portions $h^{*1}$ $h^{*2}$ between said slots are of equal dimensions between said radii, and are diametrically opposite to each other. The disk H is keyed on the shaft G, or secured by a nut and screw-thread, or otherwise, as may be desired. On the inner end of the shaft G is a wheel I, from one side of which project two pins $i$ $i$, placed diametrically opposite to each other. The number of these pins, and the number of slots in the disk H need not be confined to two; but the number of pins should always correspond with the number of slots. Between the wheel I and the outer end of the shaft G is a small pulley $j$ around which passes a band from a driving-pulley J, by means of which a rotary motion is imparted to the shaft G; or said shaft may be driven by any suitable arrangement of gearing. The slider E may be made of wood or metal or any other suitable material. On one side of the slider, surrounding the circular opening opposite the tube B, is a depression in which rests a toothed ring or annular gear-wheel K, which meshes into a gear-wheel M journalled in the slider. On one side of the gear-wheel M is attached a spur-wheel S, the number of spurs in which should correspond with the number of figures on the transparent plates P. These plates may be of glass, mica, horn, or any other suitable transparent material, and the figures may be represented thereon by painting, photographing, or any other suitable process. The plates may be circular in form, notched on their edges, and held in place on the side of the annular gear-wheel K by projections engaging with the notches; or they may be polygonal in form, and held in place by fitting in a corresponding depression on the side of the wheel K. Lateral motion of the wheel and plate is prevented by means of a flange N and pivoted latch L, as shown in figs. 3 and 4. The figures are arranged upon the transparent plates in different positions with relation to each other, having in view the apparent movements sought to be imparted to them when represented upon the wall or screen, and each figure developing the desired movement somewhat more than the figure immediately preceding it. Thus, in fig. 3 of the drawings, the appearance sought to be produced is that of persons engaged in the act of tumbling: Of the figures delineated on the plate, one represents a person standing erect; the figure immediately in front of this one represents the body inclined forward and the hands about to touch the ground; the third figure represents the hands upon the ground and the feet just leaving the ground; and so on progressively around the circle until the different developments of the desired movement are completed. In fig. 5 of the drawings, the appearance sought to be produced is that of a series of revolving rings with balls passing through them: The figure at the top of the plate presents to the observer an edge view of a ring through which a ball has just passed and toward which another ball is moving; the figure immediately to the left of the first represents a ring in a different position and a ball very near it; the third figure represents a ring further advanced in the act of revolution and a ball just passing through it; and each succeeding figure represents a further development of the desired movement. R is a rod passing through an aperture in the top of the lantern at the front end. On the upper end of this rod is a milled wheel or knob $r$, and at the lower end is a pinion $p$, more clearly shown in figs. 2 and 5. T is a block which is arranged to slide vertically in grooves on the inside of the front end plate of the lantern. Two semicircular opaque plates U U are pivoted at their centres, one on each side of the block T. On the edges of the plates U U are racks which engage with the pinion $p$. On the inside of the front end of the lantern are lugs or projections $l$, placed one on each side of the circular opening opposite the tube B, and with their upper portions opposite the centre of said openings.

The operation of my invention is as follows:

The transparent plate P is inserted in its place in the slider E, and the slider placed in the frame D so that the pins $i$ $i$ on the wheel I will engage with the spurs on the spur-wheel S. As the driving-pulley J is revolved and motion transmitted to the shaft G, the disk H alternately cuts off and admits the light from the lens-tube, accordingly as the opaque portions or the slotted portions are brought before the end of the tube; and the pins $i$ $i$ on the wheel I engage with the spur-wheel S, and impart an intermittent rotary motion to the annular gear-wheel K by means of the gear-wheel M to which said spur-wheel S is attached. The arrangement of the pins $i$ $i$ on the wheel I, and their engagement with the spur-wheel S, is such, with relation to the disk H, that when one of the slots $h^1$ $h^2$ is opposite the outer end of the lens-tube all of the figures on the plate P are represented in certain positions with relation to each other; and while one of the opaque portions $h^{*1}$ $h^{*2}$ is passing the end of the lens-tube, the position of the plate P is being changed so as to place each figure at the point just previously occupied by the preceding figure, by reason of the motion imparted by the pins $i$ $i$ on the wheel I to the annular gear-wheel K through the spur-wheel S and gear-wheel M. When the figures are arranged in a circle upon the plate P, as in fig. 5, they may be represented upon the wall or screen as arranged in a semicircle by moving down the sliding block T until it rests upon the lugs $l$ $l$, as shown in fig. 6, thus shutting off one-half of the light. The number of figures represented may be further reduced by turning the knob $r$, when the pinion $p$ will engage with the racks on the semicircular opaque plates U U and turn them so as to shut off still more of the light, as shown in fig. 7. By intermittently rotating the transparent plates while the opaque portions of the revolving disk are cutting off the light from the lens-tube, the position of the figures is changed with such rapidity that before the impression of one figure has faded from the retina, another figure is placed at the point just occupied by it; and all the figures are seen successively and apparently merged into each other so quickly that they appear to be in motion.

This instrument may be made complete in itself and used independently, without being enclosed like the ordinary magic-lantern, by substituting a board or plate A for the front end of a lantern as shown in fig. 2, and attaching the parts to said board or plate. When used in this form, by placing a lamp in the rear of the concentrating-lens O' and a reflector behind the lamp, the effect is substantially the same except that there is less brilliancy than there would be if the instrument were provided with a box or case.

This instrument is not only entertaining as a source of amusement, but is useful as a means for imparting instruction. It may be used to illustrate the workings of various kinds of machinery, such as wind-wheels, water-wheels, sawing-machines, engines, &c. It may also be used as a means of illustrating the science of astronomy, and various other sciences, by preparing and arranging the transparent plates so as to produce the desired result. Some of the parts may be slightly changed so as to produce a somewhat different result: By substituting a pinion for the wheel I and a gear-wheel for the spur-wheel S, and dispensing with the disk H, the working of a windmill or water-mill may be illustrated, by representing the mill upon a stationary plate and the wheel upon a movable plate, and rotating the movable plate by the means herein shown and described. The operation of other descriptions of machinery, and the movements of the heavenly bodies, may be illustrated in a similar manner.

Having thus fully described my invention,

What I claim as new, and desire to secure by Letters Patent, is—

1. An instrument combining the principles of the phenakistoscope and magic-lantern, so constructed that it may be used either as an attachment to an ordinary magic-lantern or as a separate and independent instrument, substantially as shown and described.

2. So combining detachable transparent plates with the slider of a magic-lantern or similar instrument as to represent moving figures upon a wall or screen, substantially as shown and described.

3. The combination of the polygonal plates with the annular gear-wheel, substantially as shown and described for the purpose specified.

4. Imparting an intermittent rotary motion to the transparent plates when inserted in place in the slider, by the means substantially as shown and described.

5. Representing the figures upon a wall or screen as arranged in a semicircle or less than a semicircle, by the means substantially as shown and described.

6. The revolving perforated disk for alternately cutting off and admitting the light, in combination with the mechanism for imparting an intermittent rotary motion to the transparent plates, substantially as shown and described.

O. B. BROWN.

Witnesses:
W. F. HAVEN,
F. HENRY CHADWICK.